United States Patent
Prasad et al.

[11] Patent Number: 5,944,874
[45] Date of Patent: Aug. 31, 1999

[54] SOLID ELECTROLYTE IONIC CONDUCTOR SYSTEMS FOR THE PRODUCTION OF HIGH PURITY NITROGEN

[75] Inventors: Ravi Prasad, East Amherst; Christian Friedrich Gottzmann, Clarence; Homer Fay, Snyder, all of N.Y.

[73] Assignee: Praxair Technology, Inc., Danbury, Conn.

[21] Appl. No.: 08/880,877

[22] Filed: Jun. 23, 1997

[51] Int. Cl.[6] ............ B01D 53/22; B01D 53/047
[52] U.S. Cl. ............ 95/54; 95/49; 95/51; 95/52; 95/122; 95/137; 95/139; 95/288
[58] Field of Search ............... 95/45, 49, 51, 95/52, 54, 117–123, 137–139, 288

[56] References Cited

U.S. PATENT DOCUMENTS

| | | | |
|---|---|---|---|
| Re. 34,595 | 5/1994 | Chen et al. | 95/54 |
| 3,925,041 | 12/1975 | Patterson et al. | 55/267 |
| 4,639,257 | 1/1987 | Duckett et al. | 95/51 X |
| 4,718,921 | 1/1988 | Makino et al. | 95/52 |
| 4,781,907 | 11/1988 | McNeill | 95/51 X |
| 4,783,203 | 11/1988 | Doshi | 95/54 X |
| 4,931,970 | 6/1990 | Prasad | 55/16 |
| 4,934,148 | 6/1990 | Prasad et al. | 95/121 X |
| 5,004,482 | 4/1991 | Haas et al. | 55/16 |
| 5,009,869 | 4/1991 | Weinberg et al. | 95/45 X |
| 5,084,073 | 1/1992 | Prasad | 55/16 |
| 5,102,432 | 4/1992 | Prasad | 55/16 |
| 5,116,396 | 5/1992 | Prasad et al. | 62/24 |
| 5,156,657 | 10/1992 | Jain et al. | 55/26 |
| 5,160,713 | 11/1992 | Mazanec et al. | 423/210 |
| 5,185,014 | 2/1993 | Prasad | 55/16 |
| 5,205,842 | 4/1993 | Prasad | 55/16 |
| 5,226,932 | 7/1993 | Prasad | 95/45 |
| 5,240,472 | 8/1993 | Sircar | 95/52 |
| 5,306,411 | 4/1994 | Mazanec et al. | 204/265 |
| 5,332,424 | 7/1994 | Rao et al. | 95/49 X |
| 5,354,547 | 10/1994 | Rao et al. | 95/45 X |
| 5,378,263 | 1/1995 | Prasad | 95/54 |
| 5,383,956 | 1/1995 | Prasad et al. | 95/45 |
| 5,447,555 | 9/1995 | Yee et al. | 95/54 |
| 5,538,536 | 7/1996 | Fuentes et al. | 95/45 |
| 5,547,494 | 8/1996 | Prasad et al. | 95/54 |
| 5,557,951 | 9/1996 | Prasad et al. | 62/648 |
| 5,700,310 | 12/1997 | Bowman et al. | 95/45 |

FOREIGN PATENT DOCUMENTS

| | | | |
|---|---|---|---|
| 0430304 | 6/1991 | European Pat. Off. | 95/52 |
| 0743088 | 11/1996 | European Pat. Off. | |
| 0778069 | 6/1997 | European Pat. Off. | |
| 4-180812 | 6/1992 | Japan | 95/51 |

*Primary Examiner*—Robert Spitzer
*Attorney, Agent, or Firm*—Bharat C. Gandhi

[57] ABSTRACT

A process for separating a feed gas stream containing elemental oxygen and nitrogen to produce a purified nitrogen gas stream by removing oxygen from the feed gas stream using an ion transport membrane to produce a retentate gas stream and a permeate gas stream, wherein the feed gas stream or the retentate gas stream is purified to remove impurities either before or after the separation step to produce the purified nitrogen gas stream.

19 Claims, 7 Drawing Sheets

SOLID ELECTROLYTE IONIC CONDUCTOR SYSTEMS FOR THE PRODUCTION OF HIGH PURITY NITROGEN

CROSS-REFERENCE

The application entitled "Hybrid Solid Electrolyte Ionic Conductor Systems for Purifying Inert Gases", U.S. Ser. No. 08/880,879 filed concurrently herewith, is incorporated herein by reference.

FIELD OF THE INVENTION

The invention relates to an apparatus and process for separating oxygen from a mixed gas feed stream to produce high purity nitrogen and, more particularly, to an apparatus and process utilizing a prepurifier or postpurifier in combination with a solid electrolyte ionic conductor membrane for separating oxygen from air to produce high purity nitrogen.

BACKGROUND OF THE INVENTION

Solid electrolyte ionic or mixed ionic-electronic conductors that can rapidly transport oxygen ions have a significant potential for use in air separation. Membranes made of such materials transport only oxygen ions and, therefore, have an infinite selectivity for the permeation of oxygen relative to all other species. This property is of particular advantage in the production of oxygen, since the product is inherently pure. Conversely, solid electrolyte materials may also be used to remove oxygen from an air stream to produce an oxygen-free "nitrogen" product.

Previously certain types of membranes, for example, organic polymer membranes, have been used to separate selected gases from air and other gas mixtures and this is an established technology. Composite hollow fibers which employ these organic polymer membranes may have separation factors that favor the permeation of oxygen over nitrogen by a factor of ten or less. Over the years, many processes employing such polymer membranes have been devised for the production of oxygen and particularly nitrogen from ambient air by taking advantage of this permeation differential. Examples of systems utilizing polymer membranes to separate oxygen from nitrogen are described in Prasad, U.S. Pat. No. 5,102,432, entitled Three-Stage Membrane Gas Separation Process and System; Prasad, U.S. Pat. No. 5,084,073, entitled Membrane Drying Process and System; and Prasad, U.S. Pat. No. 5,378,263, entitled High Purity Membrane Nitrogen.

Polymeric membranes are currently used for the commercial production of nitrogen from air. Typical membranes have $O_2/N_2$ selectivities below 8 and can be used to make ~95%–99.5% purity nitrogen efficiently in production apparatus having capacities of up to ~30 tons per day. Although, in principle, polymeric membranes could be used to produce a high purity product by using more polymeric membrane stages, the required membrane area and power makes the process uneconomical. When a high purity nitrogen product is required, therefore, additional means must be employed to remove the residual oxygen in the retentate or product stream of the membrane process.

Air is a mixture of gases which may contain varying amounts of water vapor and, at sea level, has the following approximate composition by volume: oxygen (20.9%), nitrogen (78%), argon (0.94%), with the balance consisting of other trace gases. With use of a solid electrolyte process, oxygen is removed from the feed air stream but minor constituents or impurities in the feed air stream (for example, argon, carbon dioxide, water and trace hydrocarbons) are retained in the "nitrogen" product. Although most applications can tolerate the presence of argon, the other impurities such as moisture, carbon dioxide and hydrocarbons are generally undesirable in the product.

As discussed in more detail below, solid electrolyte membranes are most practical for removing small quantities of oxygen from a gas stream. Therefore, other processes in addition to the solid electrolyte process are usually required to produce a practical high purity nitrogen product. This invention provides efficient integrated processes incorporating solid electrolyte ionic conductors for the production of high purity nitrogen. At the present time solid electrolyte processes have yet to be used for the commercial production of nitrogen and the prior art is mute on combined processes for the removal of all the undesirable impurities in the production of nitrogen gas.

The combination of polymeric membrane purifiers or adsorption purifiers with a solid electrolyte membrane, however, can produce a high purity nitrogen product that is free of oxygen, moisture and hydrogen, in contrast with the nitrogen produced when the conventional deoxo process is employed for purification.

In addition, the use of a polymeric membrane or an adsorption purifier as a prepurifier in combination with a solid electrolyte membrane advantageously removes contaminants, such as carbon- and sulfur-containing compounds, which can poison or degrade the operation of the solid electrolyte membrane, before the gas stream containing such impurities reaches the solid electrolyte membrane. Such a prepurifier also has the additional advantage of removing water vapor, carbon dioxide and hydrocarbons that are generally undesirable contaminants in the final nitrogen product.

The adsorption process requires a purge stream for regenerating the adsorbent. In certain preferred embodiments of this invention, the waste stream from the ion transport process is used as the purge to the adsorbers. The operation of a polymeric membrane system for drying and impurity removal is also greatly enhanced when the permeate side is purged and the waste stream from the ion transport process is used as the purge gas.

Moreover, the use of the waste stream from the solid electrolyte membrane as a purge stream to reflux the adsorber or polymeric membrane purifiers enhances the efficiency of these operations in comparison with the separate stand-alone purification processes. Furthermore, since the solid electrolyte process operates at elevated temperatures, the heated waste stream can also supply heat to aid in the regeneration of prepurifier adsorbents. Thus, when the solid electrolyte process operates with a reactive purge, excess heat may be available for "thermal assisted" regeneration.

The polymeric membrane and adsorption systems are typically employed to prepurify the air stream that supplies the feed to the solid electrolyte membrane. Under certain circumstances, particularly when chemical reactions occur in the solid electrolyte membrane, it may be desirable to employ the polymeric membrane or adsorption system as a postpurifier for the nitrogen product stream. These postpurifiers can be operated in the same ways as the prepurifiers.

Membrane systems have long been used for the separation of nitrogen from air. Such membrane systems include the NitroGEN™ systems developed by Praxair, Inc. are for the commercial production of nitrogen from air. The purity of the nitrogen product depends on the number of permeation stages employed. For low purities, a single stage process suffices. Higher purity can be achieved in a two stage process wherein the permeate from the second stage (which is nitrogen-rich compared to air) is recycled to the feed compressor. By adding a third stage, with feedback of the permeate streams from the second and third stages, a still higher purity can be achieved. The oxygen content in the product nitrogen can be reduced to approximately 0.5% by these means, but the required membrane area and the system power both become excessive when higher purities are specified.

Usually when an oxygen-free product is specified, it is typical to add a conventional deoxo system to treat the retentate (product) from the membrane process. In the conventional deoxo process, a quantity of pure hydrogen is added to the retentate stream which then passes through a catalyst that induces the hydrogen to react with the contained oxygen to produce water. A separate drying system is required to remove this water. It is obvious that an excess of hydrogen ($H_2 > 2O_2$) is required. Among the other problems with the conventional deoxo method, an excess of hydrogen remains in the product nitrogen. The combination of a polymeric membrane system with a conventional deoxo postpurifying system represents the current state of the art for producing high purity nitrogen in small to medium quantities.

This invention combines known polymeric membrane processes or adsorption processes synergistically with the solid electrolyte process to produce a nitrogen product that is substantially free of all undesirable impurities. This invention, therefore, does not possess the disadvantages of the conventional deoxo process and improves the overall nitrogen purification process by combining solid electrolyte technology with the known advantages and simplicity of polymer membrane processes and adsorption processes for the production of high purity nitrogen.

Solid electrolyte membranes are made from inorganic oxides, typified by calcium- or yttrium-stabilized zirconium and analogous oxides having a fluorite or perovskite structure. As mentioned above, these oxide ceramic membranes are thus very attractive for use in new air separation processes. Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C.–900° C. range. This limitation remains despite much research to find materials that work well at lower temperatures.

There are two types of ion transport membranes in use: ionic conductors that conduct only ions through the membrane and mixed conductors that conduct both ions and electrons through the membrane. As used herein, the terms "solid electrolyte ionic conductor", "solid electrolyte", "ionic conductor", and "ion transport membrane" are used to designate either an ionic-type system or a mixed conductor-type system unless otherwise specified. In the absence of a purge stream, the permeate stream that carries the oxygen away from the ion transport membrane is pure oxygen. For pressure-driven systems, both the feed and the retentate streams must be at a high pressure or the permeate stream must be at a very low pressure to create a driving force for the oxygen transport. For electrically-driven systems, a sufficiently high voltage may be applied to overcome unfavorable partial pressure systems although a purge will reduce the electrical power requirements considerably.

While an unpurged membrane is attractive for the removal of larger quantities of oxygen from inert gas streams, the oxygen recovery is limited by pressures or electrical energy that can be applied. When a purge is used, the degree of purification that can be obtained is limited. Solid electrolyte technology is described in more detail in Prasad et al., U.S. Pat. No. 5,547,494, entitled Staged Electrolyte Membrane, which is hereby incorporated by reference to more fully describe the state of the art.

Advances in the state of the art of air separation using inorganic oxide membranes have been presented in the technical literature.

Patterson et al., U.S. Pat. No. 3,925,041, entitled Thermal Swing Gas Adsorber, describes a gas adsorbent vessel for use in a thermal swing prepurifier for air prior to cryogenic air separation.

Prasad, U.S. Pat. No. 4,931,070, entitled Process and System for the Production of Dry, High Purity Nitrogen, describes an air separation membrane process wherein membrane dryers are used to prepurify the air feed and/or postpurify the nitrogen product.

Haas et al., U.S. Pat. No. 5,004,482, entitled Production of Dry, High Purity Nitrogen, describes a membrane dryer used as a prepurifier in the air stream to PSA nitrogen production, or as a postpurifier in the nitrogen product stream from such a PSA system.

Prasad et al., U.S. Pat. No. 5,116,396, entitled Hybrid Prepurifier for Cryogenic Air Separation Plants, is a continuation-in-part of the application issued as U.S. Pat. No. 4,934,148 in which a membrane dryer is used in series with a PSA prepurifier for a cryogenic air separation system.

Jain et al., U.S. Pat. No. 5,156,657, entitled Process for Pre-Purification of Air for Separation, shows an example of a PSA system for prepurification of the air to an air separation unit.

Mazanec et al., U.S. Pat. No. 5,160,713 entitled Process for Separating Oxygen from an Oxygen-Containing Gas by Using a Bi-Containing Mixed Metal Oxide Membrane, relates to an oxygen separation process employing a bismuth-containing mixed metal oxide membrane which generally provides that the separated oxygen can be collected for recovery or reacted with an oxygen-consuming substance. The oxygen-depleted retentate is apparently discarded.

Mazanec et al., U.S. Pat. No. 5,306,411, entitled Solid Multi-Component Membranes, Electrochemical Reactor Components, Electrochemical Reactors and Use of Membranes, Reactor Components, and Reactor for Oxidation Reactions, relates to a number of uses of a solid electrolyte membrane in an electrochemical reactor. It is mentioned that nitrous oxides and sulfur oxides in flue or exhaust gases can be converted into nitrogen gas and elemental sulfur, respectively, and that a reactant gas such as light hydrocarbon gas can be mixed with an inert diluent gas which does not interfere with the desired reaction, although the reason for providing such a mixture is not stated. Neither of the Mazanec et al. patents cited disclose processes to produce a high purity product from an oxygen-containing stream.

OBJECTS OF THE INVENTION

It is therefore an object of the invention to provide an efficient process of prepurifying or postpurifying a nitrogen- and oxygen-containing gas using a purifying means, such as a polymeric membrane or an adsorption bed purifying system, and a solid electrolyte ionic conductor membrane for making high purity nitrogen.

Another object of the invention is to enhance the efficiency of the process by employing proper oxygen-depleted purge gas streams or a vacuum for the permeate sides of the prepurifier and ion transport membrane and/or a reactive purge for the ion transport membrane.

Furthermore, it is an object of the invention to improve the efficiency of the process by placing the permeate side of the polymeric membrane purifying system or the desorbing bed purifying system as appropriate in series with the permeate side of the ion transport membrane with suitable intermediate heat exchange and in a suitable sequence to fully utilize available purge gas streams and thereby improve nitrogen and energy recovery.

It is a further object of the invention to enhance the efficiency of the process by purging the purifying means by using an oxygen-depleted gas or by applying a vacuum to the purifying means and to the solid electrolyte membrane.

SUMMARY OF THE INVENTION

The invention comprises a process for separating a feed gas stream containing elemental oxygen and nitrogen to produce a purified nitrogen gas stream. The process comprises removing oxygen from the feed gas stream using an ion transport module containing an ion transport membrane having a retentate side and a permeate side to respectively produce a retentate gas stream and a permeate gas stream. The feed gas stream or the retentate gas stream is purified to remove impurities either before or after the separation step to produce the purified nitrogen gas stream.

In a preferred embodiment of the invention, the impurities include water vapor. In another preferred embodiment of the invention, the impurities include at least one of sulfur-containing compounds and carbon-containing compounds. In another preferred embodiment of the invention, the feed gas stream is air. In yet another preferred embodiment of the invention, a portion of the retentate gas stream from the ion transport module, a reactive gas stream, or a low oxygen concentration gas stream is used to purge the permeate side of the ion transport membrane. In a preferred embodiment of the invention, the feed gas stream is compressed before the feed gas stream is fed into the ion transport module. In another preferred embodiment of the invention, compressed feed gas stream is warmed by transferring heat from the retentate gas stream and the permeate gas stream to the compressed feed gas stream.

In a preferred embodiment of the invention, the purification is accomplished using a polymeric membrane purifier module containing a polymer membrane having a retentate side and a permeate side. In another preferred embodiment of the invention, the permeate side of the polymeric membrane is purged using the permeate gas stream exiting the permeate side of the ion transport membrane. In yet another preferred embodiment of the invention, a vacuum is applied to at least one of the permeate side of the polymeric membrane and the permeate side of the ion transport membrane to enhance efficiency. In still another preferred embodiment of the invention, a portion of the retentate gas stream from the ion transport module, or a low oxygen concentration gas stream is first used to purge the permeate side of the ion transport membrane and, following heat transfer, is then used to purge the permeate side of the polymeric membrane. In another preferred embodiment of the invention, a portion of the retentate gas stream from the ion transport module, after cooling, is used to purge the permeate side of the polymeric membrane and the resultant gas stream is then heated and used to purge the permeate side of the ion transport membrane.

In a preferred embodiment of the invention, the purification is accomplished using an adsorption purifier module containing at least one adsorption bed. In another preferred embodiment of the invention, the adsorption bed is purged using the permeate gas stream exiting the permeate side of the ion transport membrane. In yet another preferred embodiment of the invention, a vacuum is applied to at least one of the adsorption beds of the adsorption purifier module for the regeneration of the adsorption bed. In still another preferred embodiment of the invention, the vacuum is also applied to the permeate side of the ion transport membrane to enhance efficiency. In another preferred embodiment of the invention, a portion of the retentate gas stream or a low oxygen concentration gas stream is added to the permeate gas stream and, following heat transfer, the adsorption bed is purged using the resultant gas mixture. In another preferred embodiment of the invention, a portion of the retentate gas stream from the ion transport module, after cooling, is used to regenerate an adsorption bed of the adsorption module and the resultant gas stream is then heated and used to purge the permeate side of the ion transport membrane.

In a preferred embodiment of the invention, more than one ion transport module containing an ion transport membrane having a retentate side and a permeate side is employed and the retentate gas stream from an initial ion transport module is fed into at least one subsequent ion transport module.

BRIEF DESCRIPTION OF THE DRAWINGS

Other objects, features and advantages of the invention will occur to those skilled in the art from the following description of preferred embodiments and the accompanying drawings, in which.

DETAILED DESCRIPTION OF THE INVENTION

The invention is described with reference to the figures. The basic prior art ion transport process for removing oxygen from air to produce an oxygen-free "nitrogen" product is illustrated by the schematic diagram shown in FIG. 1. In a preferred embodiment, the ion transport membrane employs a mixed conductor and is pressure-driven. The separation process is enhanced by refluxing the low pressure side of the ion transport membrane with some of the nitrogen product or with an external gas that has a low oxygen concentration. A reactive fuel gas can also be injected in the purge. If a reactive purge is employed in the ion transport membrane, the resulting waste stream cannot be utilized to purge the prepurifier since this waste stream contains carbon dioxide and water vapor. Similarly with postpurification, the resulting waste stream from a retentate gas purged pressure-driven ion transport membrane cannot be used to purge the postpurifier since it contains the impurities contained in the feed gas stream. All these purge techniques reduce the oxygen concentration on the low pressure side of the ion transport membrane and increase the driving force for transport of oxygen through the ion transport membrane. In general, however, the feed gas to the solid electrolyte portion of the system would have a preferred range of 88–99% nitrogen (more correctly, oxygen-free gas), that is, 1–12% oxygen; the more preferred range being 93–98% nitrogen (oxygen-free gas).

Figure 1:
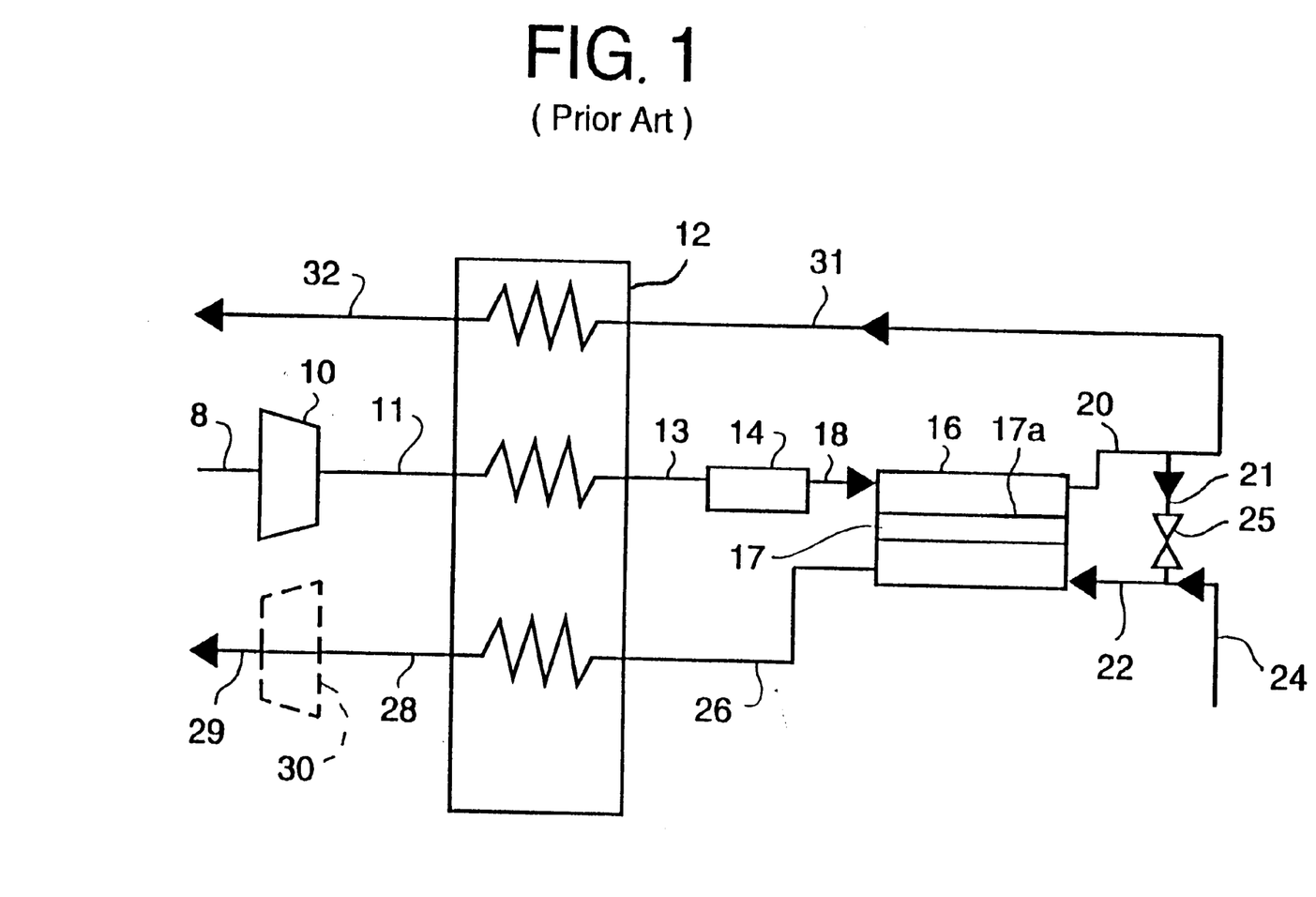
FIG. 1 is a schematic diagram of the basic prior art ion transport process for removing oxygen from air to produce an oxygen-free "nitrogen" product.

In FIG. 1, during operation, the feed gas stream 8 is compressed by compressor 10 to produce compressed feed gas stream 11. Compressed feed gas stream 11 is warmed in heat exchanger 12 by hot retentate gas stream 31 and hot waste gas stream 26 to produce warmed feed gas stream 13 which is fed into heater 14 to produce hot feed gas stream 18. Hot feed gas stream 18 is fed into ion transport module 16 including ion transport membrane 17 having a retentate side 17a and a permeate side 17b. Retentate gas stream 20 exits the ion transport module 16 and is divided into hot retentate gas stream 31 and hot gas stream 21. Hot retentate gas stream 31, as mentioned above, undergoes heat exchange in heat exchanger 12 to produce retentate gas stream 32, which is recovered as the product. Hot gas stream 21 passes through valve 25 and mixes with reactive gas stream 24 to produce purge gas stream 22. Purge gas stream 22 is used to purge the permeate side 17b of ion transport membrane 17 to produce hot waste gas stream 26. Hot waste gas stream 26, as mentioned above, undergoes heat exchange in heat exchanger 12 to produce waste gas stream 28, which may be removed by optional vacuum pump 30 to obtain gas stream 29 which is discarded.

Unfortunately, as mentioned above, the product gas stream produced by the processes such as those of FIG. 1, will contain most or all of the impurities (other than oxygen) that are present in the feed air stream. Many of these impurities can be removed be inserting a prepurifier in the feed air stream. The use according to the present invention of an ion transport membrane with a polymeric membrane dryer/prepurifier is shown in the schematic diagram in FIG. 2. Polymeric membrane dryers are well-known in the art and are described in U.S. Pat. Nos. 4,931,070 and 5,084,073. Many polymeric membrane materials exhibit high permeabilities for water and carbon dioxide compared to oxygen and nitrogen and can selectively remove these impurities from the feed air stream in a permeation module. Permeation modules are often 3-port devices but a 4-port membrane module, operated in countercurrent flow as a gas dryer, has been described in U.S. Pat. Nos. 4,931,070 and 5,084,073. The operation of the dryer is enhanced when a moisture-free gas is used to purge the permeate side of the membrane. This is readily accomplished by using all or part of the waste stream from the ion transport membrane to purge the dryer unless a reactive purge gas or postpurifier is used. The efficiency of the dryer can be further enhanced by reducing the permeate pressure by means of a vacuum pump (shown as optional in FIG. 2). The reduced pressure also enhances the operation of the ion transport membrane by increasing the oxygen partial pressure difference across the ion transport membrane.

Figure 2:
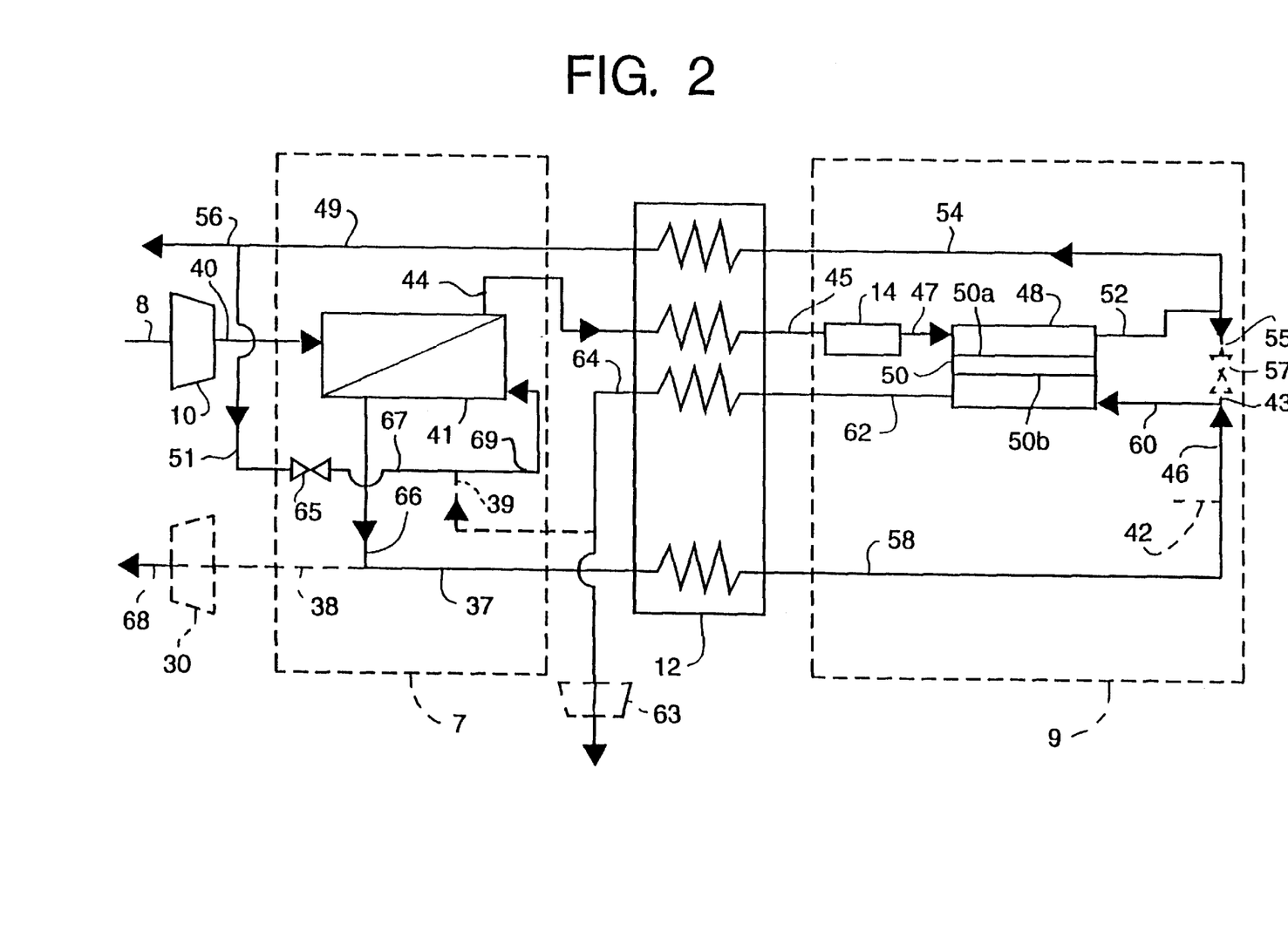
FIG. 2 is a schematic diagram of an embodiment of the invention using a polymeric membrane dryer/prepurifier.

In FIG. 2, during operation, feed gas stream 8 is compressed by compressor 10 to produce compressed feed gas stream 40. Compressed feed gas stream 40 is prepurified in polymeric membrane module 41 to remove water vapor and other impurities to produce feed gas stream 44 and waste gas stream 66. Feed gas stream 44 is warmed in heat exchanger 12 by hot retentate gas stream 54 and hot waste gas stream 62 to produce warmed feed gas stream 45 which is fed into heater 14 to produce hot feed gas stream 47. Hot feed gas stream 47 is fed into ion transport module 48 including ion transport membrane 50 having a retentate side 50a and a permeate side 50b. Retentate gas stream 52 exits ion transport module 48 and may be divided into hot retentate gas stream 54 and optional hot gas stream 55, if a non-reactive purge gas stream is used.

Hot retentate gas stream 54, as mentioned above, undergoes heat exchange in heat exchanger 12 to produce retentate gas stream 49. Retentate gas stream 49 may be divided into gas stream 51, which is passed through valve 65 to become gas stream 67, and gas stream 56, which is recovered as the product. If a non-reactive purge gas stream is used, optional gas stream 39 may be added to gas stream 67 to make gas stream 69, which is used to purge the permeate side of polymeric membrane module 41. If a reactive purge gas stream is used, waste gas stream 66 becomes gas stream 37, which undergoes heat exchange in heat exchanger 12 to become gas stream 58. Gas stream 42 can be joined with gas stream 58 to produce gas stream 46. Gas stream 46 can be joined with gas stream 43 to make purge gas stream 60. Purge gas stream 60 is used to purge the permeate side 50b of ion transport membrane 50 to produce hot waste gas stream 62. Hot waste gas stream 62, as mentioned above, undergoes heat exchange in heat exchanger 12 to produce waste gas stream 64, which is removed by optional vacuum pump 63 and discarded; this is the preferred method if gas stream 42 is a reactive gas.

The above scheme is a general scheme that works if either a reactive gas stream or a non-reactive gas stream is used to purge the permeate side 50b of ion transport membrane 50. If a non-reactive purge gas is used, however, an alternative flow scheme is also available. In this case, optional hot gas stream 55 passes through valve 57 to become gas stream 43, which, as mentioned above, is joined with gas stream 46 to form purge gas stream 60, which is used to purge the permeate side 50b of ion transport membrane 50 to produce hot waste gas stream 62. Hot waste gas stream 62 undergoes heat exchange in heat exchanger 12 to produce waste gas stream 64, which becomes gas stream 39 and is added to gas stream 67 to make gas stream 69, which, as mentioned above, is used to purge the permeate side of polymeric membrane module 41. Gas stream 66 emerging from polymeric membrane module 41 then becomes gas stream 38 which is removed by optional vacuum pump 30 to make gas stream 68, which is discarded. It should be noted that each embodiment maintains a low temperature region 7 and a high temperature region 9 appropriate to the components of the system.

Reactive purge arrangements are disclosed in "Reactive Purge for Solid Electrolyte Membrane Gas Separation", U.S. Pat. No. 5,837,125, E.P. Publ. No. 778,069, and incorporated herein by reference. Preferred configurations for ion transport modules utilizing a reactive purge are disclosed in "Solid Electrolyte Ionic Conductor Reactor Design", U.S. Pat. No. 5,820,655 and also incorporated herein by reference. Both applications are commonly owned with the present application.

Adsorption processes have been widely used for gas separation and gas purification. Unlike permeation, which is a steady-state process, practical adsorption processes are cyclical. Pressure-swing adsorption (PSA) and thermal-swing adsorption (TSA) are typical processes that are useful for gas purification. In a PSA process, the adsorption bed is operated at high pressure and the desorption bed is operated at low pressure; in a TSA process, the adsorption bed is operated at low temperature and the desorption bed is operated at high temperature. The criteria for operating stable PSA and TSA cycles are well-known in the art. Silica gel and molecular sieves are typical sorbents that are used in gas separation and purification processes. U.S. Pat. No. 5,156,657 is one example of many that show how a PSA process can be used to purify the air feed to a cryogenic air separation unit. Although the processes described in the figures discuss PSA processes, it is within the level of skill in the art to make modifications to the embodiments of the invention shown in the figures to use TSA and combined PSA-TSA processes in well-known ways, some of which will improve the overall efficiency of the process. In particular, the high temperatures of many gas streams used in the overall process allow for thermal integration with the desorption process in a TSA bed system.

Figure 3:
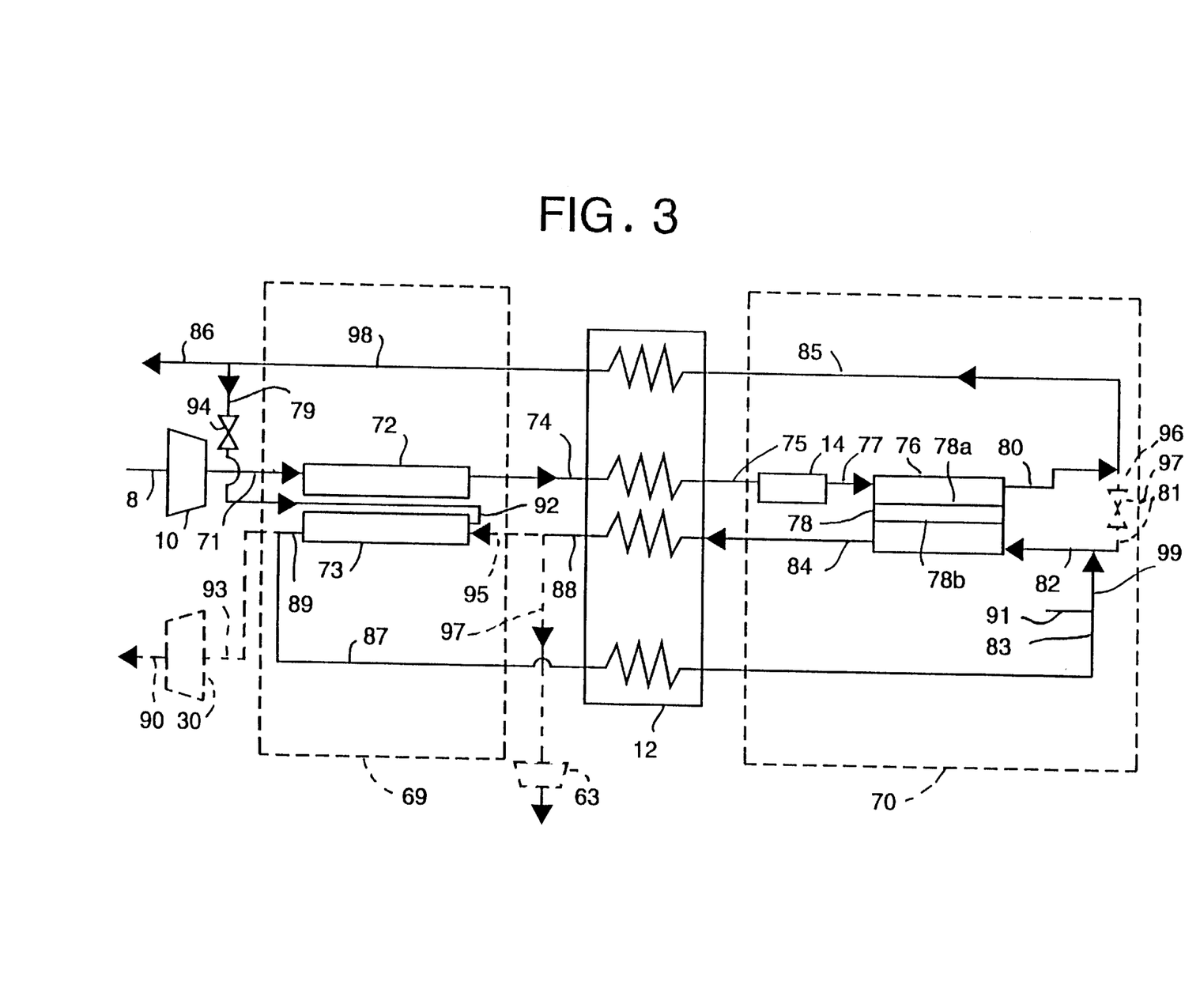
FIG. 3 is a schematic diagram of an embodiment of the invention using an adsorption prepurifier.

In FIG. 3, during operation, the feed gas stream 8 is compressed by compressor 10 to produce compressed feed gas stream 71. Compressed feed gas stream 71 is repurified in adsorption bed 72 to remove water vapor and other impurities to produce feed gas stream 74. Feed gas stream 74 is warmed in heat exchanger 12 by hot retentate gas stream 85 and hot waste gas stream 84 to produce warmed feed gas stream 75 which is fed into heater 14 to produce hot feed gas stream 77. Hot feed gas stream 77 is fed into ion transport module 76 including ion transport membrane 78 having a retentate side 78a and a permeate side 78b. Retentate gas stream 80 exits ion transport module 76 and is divided into hot retentate gas stream 85 and optional hot gas stream 96, if a non-reactive purge gas stream is used.

Hot retentate gas stream 85, as mentioned above, undergoes heat exchange in heat exchanger 12 to produce retentate gas stream 98. If a reactive purge is employed, retentate gas stream 98 is divided into gas stream 79, which passes through valve 94 to make gas stream 92, and gas stream 86, which is recovered as the product. If a reactive purge gas stream is used, waste gas stream 89 becomes gas stream 87 which undergoes heat exchange in heat exchanger 12 to become gas stream 83. Gas stream 91 can be joined with gas stream 83 to produce gas stream 99. Optionally, gas stream 81 is joined with gas stream 99 to make purge gas stream 82. Purge gas stream 82 is used to purge the permeate side 78b of ion transport membrane 78 to produce hot waste gas stream 84. Hot waste gas stream 84, as mentioned above, undergoes heat exchange in heat exchanger 12 to produce waste gas stream 88. If gas stream 91 is a reactive purge gas, then waste gas stream 88 becomes gas stream 97, which is discarded or removed by optional vacuum pump 63. This is the required method if gas stream 42 is a reactive gas and optional otherwise.

The above scheme is a general scheme that works if either a reactive gas stream or a non-reactive gas stream is used to purge the permeate side 78b of ion transport membrane 78. If a non-reactive purge gas is used, however, an alternative flow scheme is also available. In this case, optional hot gas stream 96 passes through valve 97 to become gas stream 81 and purge gas stream 82, which is used to purge the permeate side 78b of ion transport membrane 78 to produce hot waste gas stream 84. Hot waste gas stream 84 undergoes heat exchange in heat exchanger 12 to produce waste gas stream 88, which becomes optional gas stream 95 and is used to regenerate desorption bed 73. Gas stream 89 emerging from desorption bed 73 then becomes gas stream 93 which is removed by optional vacuum pump 30 to make gas stream 90, which is discarded. This is the preferred method if gas stream 91 is a non-reactive gas. As with FIG. 2, it should be noted that the embodiment maintains a low temperature region 69 and a high temperature region 70 appropriate to the components of the system.

FIG. 3 illustrates how a pair of adsorbent beds can be disposed to prepurify the feed air to a ion transport membrane. In FIG. 3, adsorption bed 72 is in the feed stream gas stream 71 where water and carbon dioxide are taken up by the adsorbent. Simultaneously, desorption bed 73 is being purged and undergoing desorption. After a predetermined time, before "breakthrough" of the impurities, the adsorption bed 72 and desorption bed 73 are interchanged (by means of valves not shown in FIG. 3) and the regenerated desorption bed 73 is used to adsorb the impurities while the impurities are desorbed from the spent adsorption bed 72. In FIG. 3, the purge gas stream 95 is the waste gas stream from the ion transport module 76. Because the adsorption occurs at high pressure and the desorption at low pressure, the prepurifier operates as a PSA process. As in FIG. 2, the use of optional vacuum pump 30 will enhance the operation of both the prepurifier and the ion transport membrane. Because the ion transport process requires a high temperature, some of the heat energy in the ion transport module waste gas stream can be used to assist the desorption process in the prepurifier, thus making a combined PSA-TSA process. The ion transport membrane 78 is generally operated at a temperature in excess of 400 C., preferably in the range of 400° C.–1200° C., more preferably in the range of 600° C.–1000° C. Because of the need to maintain these temperatures, the gas stream fed into the ion transport module 76 is often heated.

FIGS. 2 and 3 illustrate how the ion transport process can be synergistically combined with a membrane or adsorption prepurifier by using the output of the prepurifier as the feed stream for the ion transport membrane and the waste stream from the ion transport membrane as the purge stream for the prepurifier. In actual practice, the processes may be more elaborate. The ion transport membrane may comprise multiple stages and/or modules connected in various series and parallel configurations.

Figure 4:
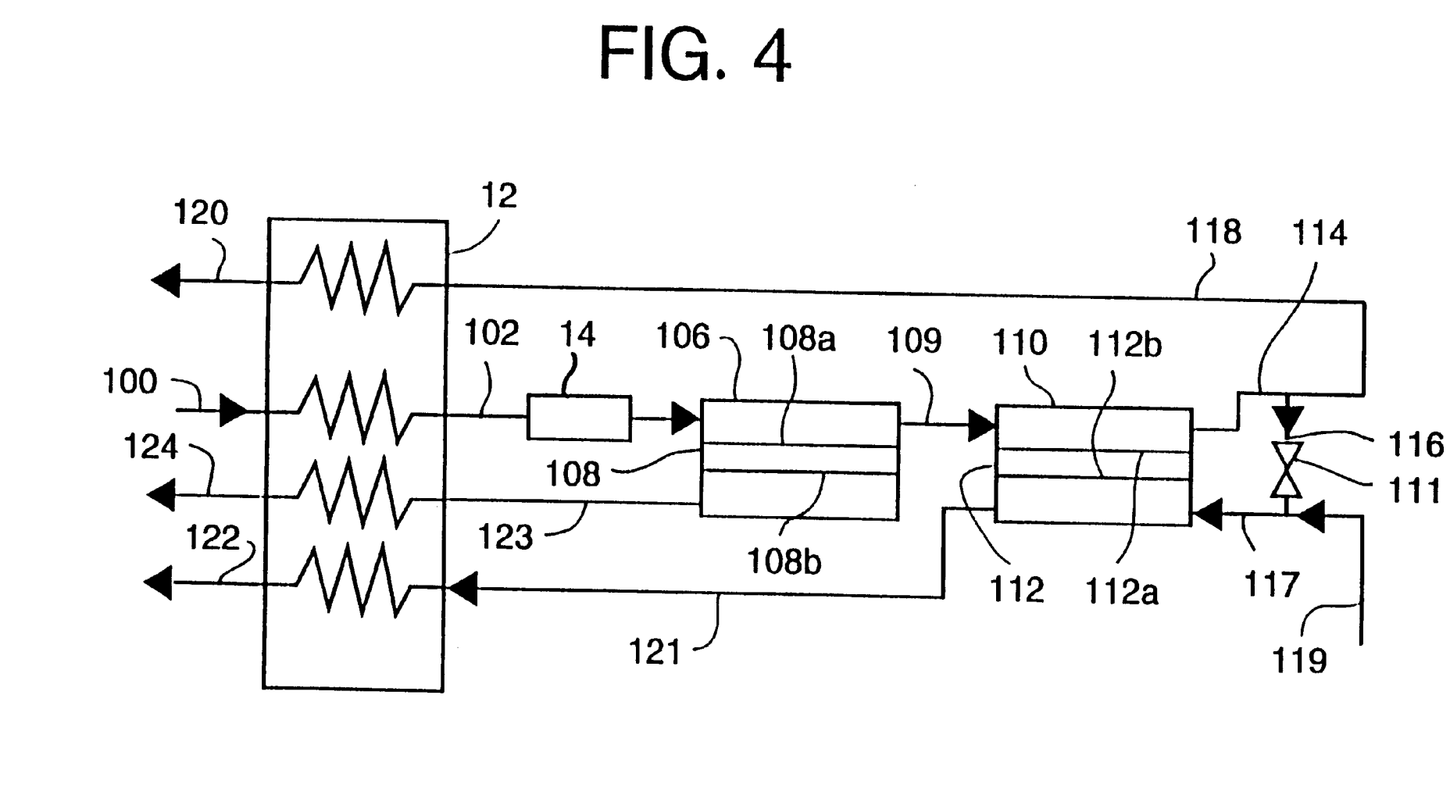
FIG. 4 is a schematic diagram of an embodiment of the invention having a two stage ion transport process for producing high purity nitrogen and oxygen.

A two stage ion transport process, for producing high purity nitrogen and oxygen, is depicted in FIG. 4. In FIG. 4, during operation, the prepurified feed gas stream 101 is warmed in heat exchanger 12 by hot retentate gas stream 118 and hot waste gas streams 121 and 123 to produce warmed feed gas stream 102 which is fed into heater 14 to produce hot feed gas stream 104. Hot feed gas stream 104 is fed into first ion transport module 106 including ion transport membrane 108 having a retentate side 108a and a permeate side 108b. First retentate gas stream 109 exits first ion transport module 106 and is fed into second ion transport module 110 including ion transport membrane 112 having a retentate side 112a and a permeate side 112b. Second retentate gas stream 114 exits second ion transport module 110 and is divided into hot retentate gas stream 118 and hot gas stream 116. Hot retentate gas stream 118, as mentioned above, undergoes heat exchange in heat exchanger 12 to produce retentate gas stream 120, which is recovered as the product. Hot gas stream 116 passes through valve 111 to mix with optional gas stream 119 to produce purge gas stream 117. Purge gas stream 117 is used to purge the permeate side 112b of second ion transport membrane 112 to produce hot waste gas stream 121. Hot waste gas stream 121, as mentioned above, undergoes heat exchange in heat exchanger 12 to produce waste gas stream 122 which is discarded or, optionally, can be used as a purge for the prepurifier stage (not shown).

In FIG. 4, the permeate side 108b of the second ion transport membrane 108 is not refluxed or is minimally purged and permeate gas stream 123 is pure or relatively pure oxygen which can be withdrawn as a co-product, after passing through heat exchanger 12 to become stream 124. In contrast, the permeate side 112b of the second ion transport membrane 112 is purged with gas stream 116 from second retentate gas stream 114 or with external oxygen-depleted stream 119, if it is available. Purge gas stream 117 reduces the oxygen concentration on the permeate side 112b of the second ion transport membrane 112 and enhances the driving force for removing oxygen from first retentate gas stream 109. Second ion transport membrane permeate gas stream 121, after passing through heat exchanger 12 to become stream 122, can be used as a reflux or purge stream for the membrane or adsorption prepurifier if no reactive purge was added. Another possibility would be inject a reactive fuel gas, such as methane, into the second ion transport module purge gas stream 117 to react with the oxygen transported through the ion transport membrane 112 and greatly reduce the oxygen partial pressure. This enhances the oxygen removal process in second ion transport module 110. In this case, a portion of product gas stream would be used to purge the dryer-prepurifier. As noted above, if such a reactive gas stream is used, second ion transport module permeate gas stream 121 would contain water vapor and carbon dioxide from the combustion of the fuel and gas stream 121 must be vented. If an adsorption prepurifier is employed that can be operated in the thermal-swing mode, then the sensible heat in the second ion transport module permeate gas stream 121, derived from combustion of the fuel, can supply the energy required for the thermal-swing process and this heat may also be sufficient to eliminate the need for heater 14.

The polymeric membrane or adsorption bed prepurifier or postpurifier may also contain multiple stages and/or modules connected in various series and parallel configurations. An adsorption prepurifier would typically employ two beds but may have more than two beds. The "cycle" may also comprise many steps, for example, pressurization, blowdown, cooldown and heating, and equalization, in addition to the adsorption and desorption steps. A moving bed adsorptive prepurifier could also be used.

More than one prepurification process can be used. For example, a membrane dryer could be used to dry the air which is sent to a PSA unit for the removal of carbon dioxide and hydrocarbons. The air would then be separated into pure nitrogen in the ion transport membrane. The ion transport waste gas stream, comprising oxygen and any product nitrogen or added gas used for purging the ion transport permeate, would serve to purge the PSA unit and then purge the membrane dryer.

While in most applications it is desirable to remove the impurities in a membrane or adsorption prepurifier, there may be situations where it is better to remove the impurities after the ion transport module in a postpurifier. Some oxygen-containing compounds, such as $NO_x$, can be dissociated in the ion transport membrane and the oxygen removed by electrochemical transport better than in a prepurifier. The trace impurities can then be removed in a postpurifier. Postpurification would also remove any impurities that leak or back diffuse from the purge side to the product side in the ion transport membrane. This is particularly important in reactively purged processes.

Figure 5:
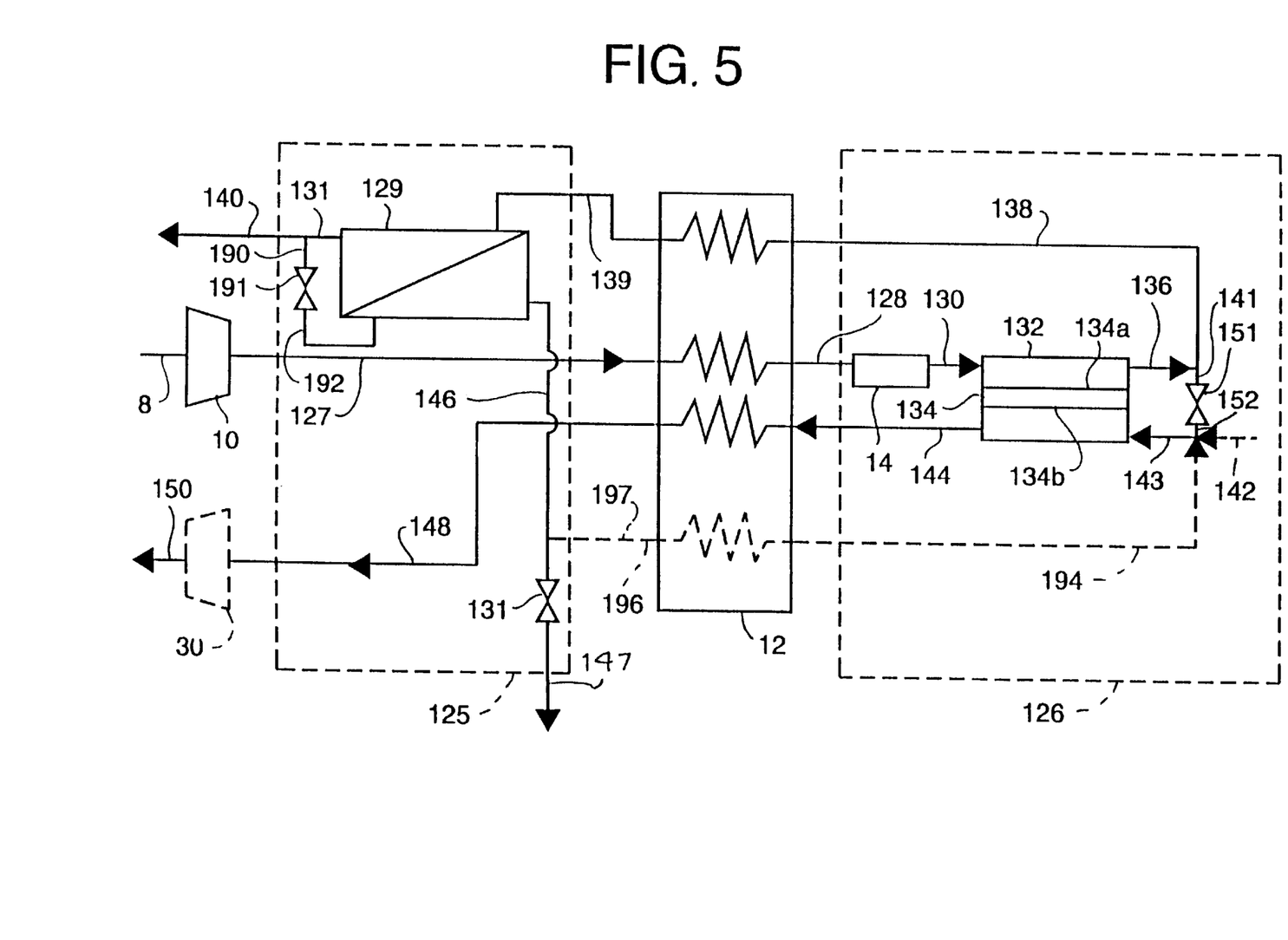
FIG. 5 is a schematic diagram of an embodiment of the invention similar to that of FIG. 2, except that the polymeric membrane is used as a postpurifier rather than a prepurifier.

FIG. 5 shows one way that a polymeric membrane could be employed in a postpurifier, using the cooled ion transport waste gas stream as the purge stream for the membrane unit. While this process might be adequate for some purposes, it allows impurities to back diffuse through the polymer membrane and enter the nitrogen product.

In FIG. 5, during operation, feed gas stream 8 is compressed by compressor 10 to produce compressed feed gas stream 127. Compressed feed gas stream 127 is warmed in heat exchanger 12 by hot retentate gas stream 138 and hot waste gas stream 144 to produce warmed feed gas stream 128 which is fed into heater 14 to produce hot feed gas stream 130 in a high temperature region 126. Hot feed gas stream 130 is fed into ion transport module 132 including ion transport membrane 134 having a retentate side 134a and a permeate side 134b. Retentate gas stream 136 exits ion transport module 132 and may be divided into hot retentate gas stream 138 and optional hot gas stream 141, through valve 151 if a non-reactive purge gas stream is used.

Hot retentate gas stream 138, as mentioned above, undergoes heat exchange in heat exchanger 12 to produce retentate gas stream 139 which is postpurified using polymeric membrane module 129 in a low temperature region 125 to remove water vapor and other impurities to produce nitrogen gas stream 131 which is divided into gas stream 190 which passes through valve 191 to become gas stream 192, and gas stream 140, which is recovered as the product. Gas stream 192 is used to purge polymeric membrane 129 exiting as gas stream 146 which either passes through valve 131 and is discarded as gas stream 147 or becomes optional gas stream 196. Optional gas stream 196 is heated in heat exchanger 12 to form gas stream 194. Gas streams 142 and 152 can optionally join gas stream 194 to form gas stream 143. Gas stream 143 is used to purge the permeate side 134b of ion transport membrane 134. Hot waste gas stream 144, as mentioned above, undergoes heat exchange in heat exchanger 12 to produce waste gas stream 148. Gas stream 148 is passed through optional vacuum pump 30 to form gas stream 150, which is discarded. It should be noted that the use of gas stream 142 for purging the permeate side 134b of ion transport membrane 134 eliminates gas stream 141 or reduces the size of gas stream 141 and therefore improves the amount of nitrogen product recovery.

Figure 6:
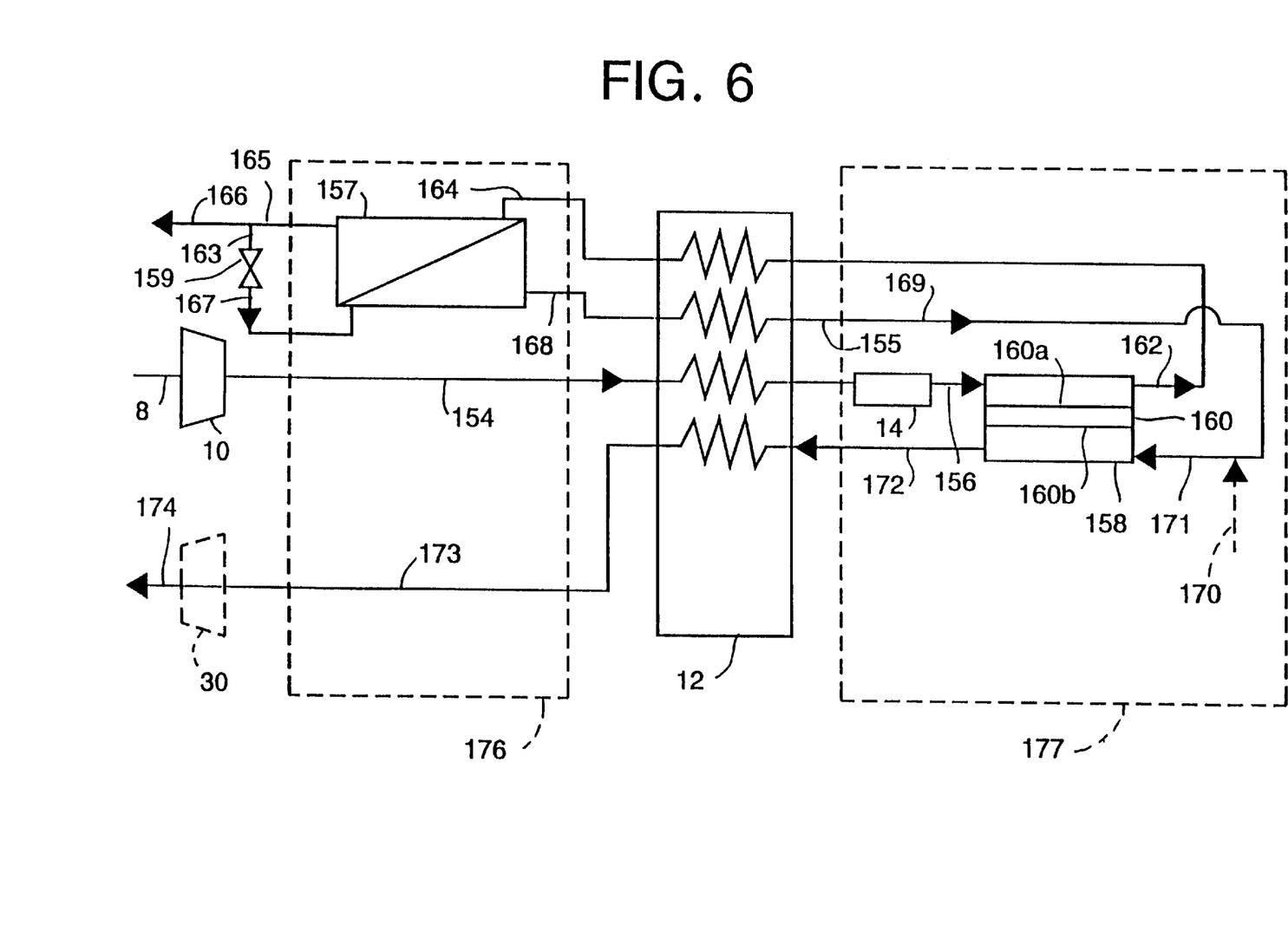
FIG. 6 is a schematic diagram of an embodiment of the invention where a portion of the product nitrogen is used to purge the permeate side of the polymeric membrane post-purifier and is then heated in the heat exchanger and used to purge the low pressure side of the ion transport membrane.

The embodiment of the invention shown in FIG. 6 would be employed with a reactive purge and non-reactive purge. In this configuration, a portion of the product nitrogen is used to purge the permeate side of the membrane postpurifier. This stream is then heated in the heat exchanger and used to purge the low pressure side of the ion transport membrane. Since the ion transport membrane can only transport oxygen, the impurities in this gas stream cannot back diffuse in this device. This is the essential method if a reactive purge gas stream is used in the ion transport module.

In FIG. 6, during operation, feed gas stream 8 is compressed by compressor 10 to produce compressed feed gas stream 154. Compressed feed gas stream 154 is warmed in heat exchanger 12 by hot retentate gas stream 162 and hot waste gas stream 172 to produce warmed feed gas stream 155 which is fed into heater 14 to produce hot feed gas stream 156. Hot feed gas stream 156 is fed into ion transport module 158 including ion transport membrane 160 having a retentate side 160a and a permeate side 160b. Retentate gas stream 162 exits ion transport module 158 and, as mentioned above, undergoes heat exchange in heat exchanger 12 to produce retentate gas stream 164 which is postpurified using polymeric membrane module 157 to remove water vapor and other impurities to produce nitrogen gas stream 165. Nitrogen gas stream 165 is divided into gas stream 163 and nitrogen gas stream 166, which is recovered as the product. Gas stream 163 passes through valve 159 to produce gas stream 167 which is used to purge polymeric membrane module 157 to produce purge gas stream 168. Purge gas stream 168 is warmed in heat exchanger 12 by hot retentate gas stream 162 and hot waste gas stream 172 to produce warm purge gas stream 169 which mixes with optional gas stream 170 to produce purge gas stream 171. Purge gas stream 171 is used to purge the permeate side 160b of ion transport membrane 160 to produce hot waste gas stream 172. Hot waste gas stream 172, as mentioned above, undergoes heat exchange in heat exchanger 12 to produce waste gas stream 173 which is removed by optional vacuum pump 30 to produce gas stream 174, which is discarded. As with FIGS. 2–5, the embodiment of the invention depicted in FIG. 6 maintains a low temperature region 176 and a high temperature region 177 appropriate to the components of the system.

Figure 7:
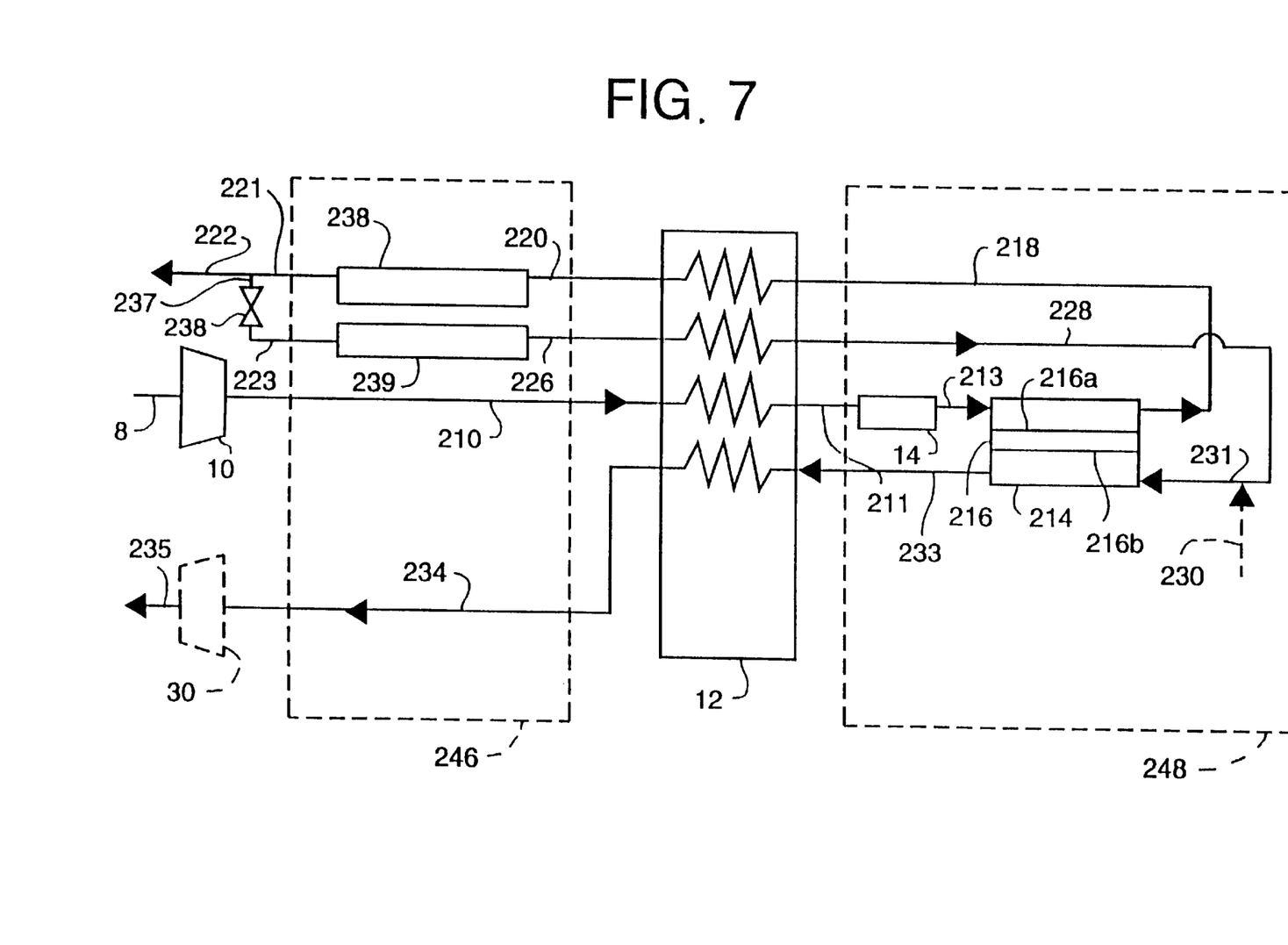
FIG. 7 is a schematic diagram of an embodiment of the invention where a portion of the product nitrogen is used to purge the permeate side of the adsorption postpurifier and is then heated in the heat exchanger and used to purge the low pressure side of the ion transport membrane.

FIG. 7 is a process that can be employed with either reactive or non-reactive purge gas streams.

In FIG. 7, during operation, feed gas stream 8 is compressed by compressor 10 to produce compressed feed gas stream 210. Compressed feed gas stream 210 is warmed in heat exchanger 12 by hot retentate gas stream 218 and hot waste gas stream 233 to produce warmed feed gas stream 211 which is fed into heater 14 to produce hot feed gas stream 213. Hot feed gas stream 213 is fed into ion transport module 214 including ion transport membrane 216 having a retentate side 216a and a permeate side 216b. Retentate gas stream 218 exits ion transport module 214 and, as mentioned above, undergoes heat exchange in heat exchanger 12 to produce retentate gas stream 220 which is postpurified using adsorption bed 238 to remove water vapor and other impurities to produce nitrogen gas stream 221. Nitrogen gas stream 221 is divided into gas stream 237 and nitrogen gas stream 222, which is recovered as the product. Gas stream 237 passes through valve 238 to produce gas stream 223 which is used to purge desorption bed 239 to produce purge gas stream 226. Purge gas stream 226 is warmed in heat exchanger 12 by hot retentate gas stream 218 and hot waste gas stream 233 to produce warm purge gas stream 228 which mixes with optional gas stream 230 to produce purge gas stream 231. Purge gas stream 231 is used to purge the permeate side 216b of ion transport membrane 216 to produce hot waste gas stream 233. Hot waste gas stream 233, as mentioned above, undergoes heat exchange in heat exchanger 12 to produce waste gas stream 234 which is removed by optional vacuum pump 30 to produce gas stream 235, which is discarded. As with FIGS. 2–6, the embodiment of the invention depicted in FIG. 7 maintains a low temperature region 246 and a high temperature region 248 appropriate to the components of the system.

The term "nitrogen" as used herein usually means oxygen-depleted gas, that is, oxygen-depleted relative to the feed gas. As discussed above, the ion transport membrane only allows oxygen permeation. Therefore, the composition of the retentate will depend on the composition of the feed gas. The feed gas will be depleted of oxygen but will retain nitrogen and any other gases (for example, argon) present in the feed gas. The meaning of the term will be clear to one of skill in the art in the context of the use of the term in light of the invention as disclosed herein.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

The term "high purity" refers to a product stream which contains less than five percent by volume of undesired gases. Preferably the product is at least 99.0% pure, more preferably 99.9% pure, and most preferably at least 99.99% pure, where "pure" indicates an absence of undesired gases.

Many alternative variations of physical elements such as inter-system and inter-stage heat exchangers, inter-coolers, heaters, etc., that are required in the practice of the invention may be used in any appropriate fashion in this invention. The use of these elements, for example, the heat exchangers described herein, often enhances the energy efficiency of the overall process. Such components and their operation are well known in the art and in the practice of gas separation and gas processing and their appropriate use in the present invention would be understood to those of skill in the art.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for separating a feed gas stream containing elemental oxygen and nitrogen to produce a purified nitrogen gas stream, said process comprising:

removing oxygen from the feed gas stream in a high temperature region in excess of 400° C. using an ion transport module containing an ion transport membrane having a retentate side and a permeate side to respectively produce a retentate gas stream and a permeate gas stream;

purifying the feed gas stream or the retentate gas stream in a purifier in a low temperature region below 400° C. to remove impurities either before or after the removal of oxygen step to produce the purified nitrogen gas stream; and wherein at least a portion of at least one of the retentate gas stream and the permeate gas stream, after cooling to below 400° C., is utilized to purge the purifier.

2. The process according to claim 1, wherein the impurities include water vapor.

3. The process according to claim 2, wherein the impurities include at least one of sulfur-containing compounds and carbon-containing compounds.

4. The process according to claim 1, wherein the feed gas stream is air.

5. The process according to claim 1 further comprising:

compressing the feed gas stream before oxygen is removed from the feed gas stream using the ion transport module.

6. The process according to claim 5, further comprising:

warming the compressed feed gas stream from said low temperature region to a temperature in excess of 400° C. before the feed gas stream is fed into said high temperature region.

7. The process according to claim 6, further comprising:
cooling both the retentate and permeate gas streams.

8. The process according to claim 6, wherein the warming is accomplished by transferring heat from the retentate gas stream and the permeate gas stream to the compressed feed gas stream.

9. The process according to claim 1, wherein the purification is accomplished using a polymeric membrane purifier module containing a polymer membrane having a retentate side and a permeate side.

10. The process according to claim 9, wherein the permeate side of the polymeric membrane is purged using the permeate gas stream exiting the permeate side of the ion transport membrane when a non-reactive purge is employed.

11. The process according to claim 9, wherein a portion of the retentate gas stream from the ion transport module or a low oxygen concentration gas stream is first used to purge the permeate side of the ion transport membrane and, following heat transfer, is then used to purge the permeate side of the polymeric membrane.

12. The process according to claim 9, wherein a portion of the retentate gas stream from the ion transport module, after cooling, is used to purge the permeate side of the polymeric membrane and a gas stream resulting therefrom is then heated and used to purge the permeate side of the ion transport membrane.

13. The process according to claim 1, wherein the purification is accomplished using an adsorption purifier module containing at least one adsorption bed.

14. The process according to claim 13, wherein the at least one adsorption bed of the adsorption purifier module is purged using the permeate gas stream exiting the permeate side of the ion transport membrane.

15. The process according to claim 13, wherein a portion of the retentate gas stream or a low oxygen concentration gas stream is added to the permeate gas stream and, following heat transfer, the adsorption bed is purged using the resultant gas mixture.

16. The process according to claim 13, wherein a portion of the retentate gas stream from the ion transport module, is used to regenerate an adsorption bed of the adsorption module and the resultant gas stream is then heated and used to purge the permeate side of the ion transport membrane.

17. The process according to claim 1, wherein more than one ion transport module containing an ion transport membrane having a retentate side and a permeate side is employed and the retentate gas stream from an initial ion transport module is fed into at least one subsequent ion transport module.

18. A process for separating an air stream to produce a purified nitrogen gas stream, said process comprising:

compressing the air stream;

transferring heat from a nitrogen retentate gas stream and a permeate gas stream to the compressed air stream;

removing oxygen from the warmed compressed air stream using an ion transport module containing an ion transport membrane having a retentate side and a permeate side to respectively produce the nitrogen retentate gas stream and the permeate gas stream;

wherein the air stream or the nitrogen retentate gas stream is purified using a polymeric membrane purifier module containing a polymeric membrane having a retentate side and a permeate side to remove impurities including water vapor and at least one of sulfur-containing compounds and carbon-containing compounds, either before or after the removal of oxygen step to produce the purified nitrogen gas stream;

wherein a portion of the nitrogen retentate gas stream from the ion transport module or a low oxygen concentration gas stream is first used to purge the permeate side of the ion transport membrane and, following heat transfer, is then used to purge the permeate side of the polymeric membrane; and wherein a vacuum is applied to the at least one of the permeate side of the polymeric membrane and the permeate side of the ion transport membrane to enhance efficiency.

19. A process for separating an air stream to produce a purified nitrogen gas stream, said process comprising:

compressing the air stream;

transferring heat from a nitrogen retentate gas stream and a permeate gas stream to the compressed air stream;

removing oxygen from the warmed compressed air stream using an ion transport module containing an ion transport membrane having a retentate side and a permeate side to respectively produce the nitrogen retentate gas stream and the permeate gas stream;

wherein the air stream or the nitrogen retentate gas stream is purified using an adsorption purifier module containing at least one adsorption bed to remove impurities including water vapor and at least one of sulfur-containing compounds and carbon-containing compounds, either before or after the removal of oxygen step to produce the purified nitrogen gas stream;

wherein a portion of the nitrogen retentate gas stream or a low oxygen concentration gas stream is added to the permeate gas stream and, following heat transfer, the adsorption bed is purged using the resultant gas mixture; and wherein a vacuum is applied to the at least one adsorption bed of the adsorption purifier module for the regeneration of the adsorption bed and the vacuum is also applied to the permeate side of the ion transport membrane to enhance efficiency.

* * * * *

UNITED STATES PATENT AND TRADEMARK OFFICE
CERTIFICATE OF CORRECTION

PATENT NO. : 5,944,874
DATED : August 31, 1999
INVENTOR(S) : Prasad et al.

It is certified that error appears in the above-indentified patent and that said Letters Patent is hereby corrected as shown below:

In claim 15, line 4, prior to "absorption bed" insert
--the at least one--.

Signed and Sealed this

Eighteenth Day of April, 2000

Attest:

Q. TODD DICKINSON

Attesting Officer

Director of Patents and Trademarks